(12) United States Patent
Burton et al.

(10) Patent No.: US 7,124,243 B2
(45) Date of Patent: Oct. 17, 2006

(54) METHODS AND SYSTEMS OF CACHE MEMORY MANAGEMENT AND SNAPSHOT OPERATIONS

(75) Inventors: David Alan Burton, Vail, AZ (US); Noel Simen Otterness, Lafayette, CO (US)

(73) Assignee: Pillar Data Systems, Inc., San Jose, CA (US)

( * ) Notice: Subject to any disclaimer, the term of this patent is extended or adjusted under 35 U.S.C. 154(b) by 530 days.

(21) Appl. No.: 10/440,347

(22) Filed: May 16, 2003

(65) Prior Publication Data

US 2004/0230737 A1    Nov. 18, 2004

(51) Int. Cl.
*G06F 12/00* (2006.01)
(52) U.S. Cl. .................................... 711/113
(58) Field of Classification Search ............. 711/113, 711/216
See application file for complete search history.

(56) References Cited

U.S. PATENT DOCUMENTS

| | | | | |
|---|---|---|---|---|
| 4,499,539 | A * | 2/1985 | Vosacek .................. 707/205 |
| 5,379,391 | A | 1/1995 | Belsan et al. |
| 5,790,774 | A * | 8/1998 | Sarkozy .................... 714/6 |
| 5,878,430 | A * | 3/1999 | Lafuse .................. 707/103 R |
| 5,895,488 | A * | 4/1999 | Loechel .................. 711/135 |
| 6,014,730 | A | 1/2000 | Ohtsu |
| 6,076,148 | A | 6/2000 | Kedem |
| 6,115,802 | A | 9/2000 | Tock et al. |
| 6,182,198 | B1 | 1/2001 | Hubis et al. |
| 6,192,450 | B1 * | 2/2001 | Bauman et al. .......... 711/135 |
| 6,216,198 | B1 | 4/2001 | Baba |
| 6,216,199 | B1 | 4/2001 | DeKoning et al. |
| 6,292,880 | B1 * | 9/2001 | Mattis et al. ............. 711/216 |
| 6,338,115 | B1 * | 1/2002 | Galbraith et al. ......... 711/113 |
| 6,434,681 | B1 | 8/2002 | Armangau |
| 6,460,122 | B1 * | 10/2002 | Otterness et al. ......... 711/154 |

(Continued)

OTHER PUBLICATIONS

Snap View Software, Maximize Information Protection and Availability to Reach New Levels of Success, Copyright 2002, pp. 1-4, EMC Corporation, Sep. 2002, C806.3 Data Sheet, MA, US.

(Continued)

*Primary Examiner*—Woo H. Choi
(74) *Attorney, Agent, or Firm*—Robert Moll

(57) ABSTRACT

The present invention relates to a cache memory management system suitable for use with snapshot applications. The system includes a cache directory including a hash table, hash table elements, cache line descriptors, and cache line functional pointers, and a cache manager running a hashing function that converts a request for data from an application to an index to a first hash table pointer in the hash table. The first hash table pointer in turn points to a first hash table element in a linked list of hash table elements where one of the hash table elements of the linked list of hash table elements points to a first cache line descriptor in the cache directory and a cache memory including a plurality of cache lines, wherein the first cache line descriptor has a one-to-one association with a first cache line. The present invention also provides for a method converting a request for data to an input to a hashing function, addressing a hash table based on a first index output from the hashing function, searching the hash table elements pointed to by the first index for the requested data, determining the requested data is not in cache memory, and allocating a first hash table element and a first cache line descriptor that associates with a first cache line in the cache memory.

65 Claims, 13 Drawing Sheets

U.S. PATENT DOCUMENTS

| | | | |
|---|---|---|---|
| 6,467,025 | B1 | 10/2002 | Taylor |
| 2002/0042796 | A1 | 4/2002 | Igakura |
| 2002/0073276 | A1 | 6/2002 | Howard et al. |
| 2002/0178335 | A1 | 11/2002 | Selkirk et al. |
| 2004/0230737 | A1* | 11/2004 | Burton et al. .................. 711/3 |

OTHER PUBLICATIONS

Veritas Database Edition for Oracle, Technical Overview: Storage Checkpoints for Block-Level Incremental Backup and Storage Rollback, Copyright Jun. 2000, pp. 1-25. Veritas Software Corporation. CA. US.

Richard Barker, Paul Massiglia, Storage Area Network Essentials, A Complete Guide to Understanding and Implementing SANs, Copyright 2002, pp. 224-229, 284-286, John Wiley & Sons, Inc., US and Canada.

Evan Marcus, Hal Stern, Blueprints for High Availability, Designing Resilient Distributed Systems, Copyright 2000, p. 261, John Wiley & Sons, Inc., US and Canada.

* cited by examiner

METHODS AND SYSTEMS OF CACHE MEMORY MANAGEMENT AND SNAPSHOT OPERATIONS

BACKGROUND

The present invention relates to cache memory management and snapshot operations in a data storage system.

This application incorporates herein by reference U.S. application Ser. No. 10/354,797 entitled, Methods and Systems of Host Caching, filed on Jan. 29, 2003.

A data storage system may use snapshots for backup, data mining, or testing of software programs in development. A snapshot is a usable image of the data at an instant in time. The snapshot results in two data images: (1) the original data that can be read and written by applications as soon as the snapshot is created, and (2) the snapshot that can be backed up or mined. Some techniques allow a snapshot to be modified while others create read-only images. One technique of snapshot is copy-on-write. In copy-on-write, upon getting a request to store modified data, the data storage system first copies the original data to a target storage space before permitting the modification to be written to its source storage space. The need for high data availability in data storage systems may require making frequent snapshots of data. However, frequent snapshots consume system resources such as cache memory, the internal memory bandwidth, storage device capacity and the storage device bandwidth.

SUMMARY OF THE INVENTION

The invention relates to a cache memory management system. In an embodiment, the system includes a cache memory including a cache directory including search elements and cache line descriptors and a plurality of cache lines, wherein a first cache line descriptor has a one-to-one association with a first cache line and a cache manager receives a request for data from an application and uses a search algorithm to locate a first search element that points to the first cache line descriptor.

In another embodiment, the invention relates to a method in a cache memory management system receiving a request for data from a first application, determining the requested data is not in cache memory and allocating a first search element and a first cache line descriptor that associate with a first cache line in cache memory. The method further includes the steps of staging the data from a source VLUN to the first cache line, receiving a request for the same data from a snapshot application, allocating a second search element, wherein the second search element and the first cache line descriptor associate with the same data in the first cache line in the cache memory. The method also includes the steps of receiving a request from the first application to store updated data, allocating a third search element and a second cache line descriptor that associate with a second cache line for the updated data, and writing the updated data into the second cache line. The method may further include writing the updated data from the second cache line and the data from the first cache line to one or more nonvolatile storage devices.

DETAILED DESCRIPTION OF THE PREFERRED EMBODIMENTS

The following description includes the best mode of carrying out the invention. The detailed description is made for the purpose of illustrating the general principles of the invention and should not be taken in a limiting sense. The scope of the invention is determined by reference to the claims. Each part is assigned its own part number throughout the specification and drawings.

Figure 1:
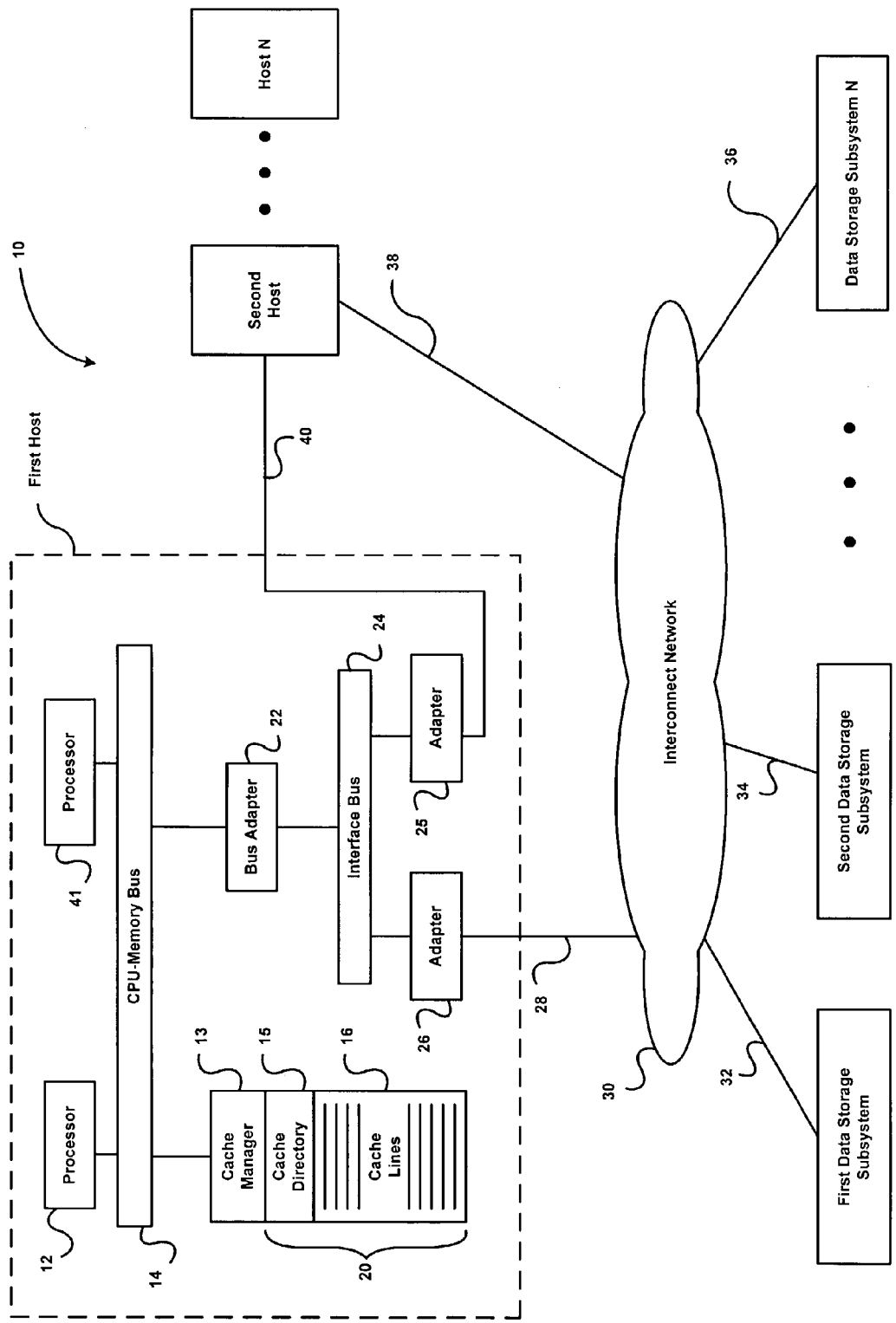
FIG. 1 illustrates an embodiment of a data storage system.

FIG. 1 illustrates a data storage system 10, including a plurality of hosts coupled to data storage subsystem(s). Each host is a computer that can connect to client(s), to data storage subsystem(s), and each other. Each host provides software/hardware interfaces such as network interface cards and software drivers to implement Ethernet, Fibre Channel, ATM, and SCSI, and InfiniBand. Hennessy and Patterson, *Computer Architecture: A Quantitative Approach* (2003), and Patterson and Hennessy, *Computer organization and Design: The Hardware/Software Interface* (1998) describe computer hardware and software, storage systems, caching, and networks and are incorporated by reference.

In an embodiment, the first host includes a motherboard with a CPU-memory bus 14 that communicates with dual processors 12 and 41. The processor used is not essential to the invention and could be any suitable processor such as the Intel Pentium 4 processor. Also, one could implement the invention using a single processor in each host or more than two processors to meet more stringent performance requirements. The arrangement of the processors is not essential to the invention.

The first host includes a cache manager 13, a cache memory 20 including a cache directory 15 and cache lines 16. The cache memory 20 is nonvolatile memory or volatile memory or a combination of both. Nonvolatile memory protects data in the event of a power interruption or a host failure. Data is defined as including user data, instructions, and metadata. Nonvolatile memory may be implemented with a battery that supplies power to the DRAM to make it nonvolatile memory when a conventional external power interrupt circuit detects a power interruption or with inherently nonvolatile semiconductor memory.

Each host includes a bus adapter 22 between the CPU-memory bus 14 and an interface bus 24. Each host runs an operating system such as Linux, UNIX, a Windows OS, or another suitable operating system. Tanenbaum, *Modern Operating Systems* (2001) describes operating systems in detail and is hereby incorporated by reference. The first host is representative of the other hosts, but this feature is not essential to the invention.

The first host can communicate with the second host through an interconnect 40, shown as connected to an adapter 25 to the interface bus 24. The PCI bus is one suitable interface bus and the interconnect 40 may be any suitable known bus, SAN, LAN, or WAN technology. In an embodiment, the interconnect 40 is a dedicated Fibre Channel (FC) point-to-point link that connects to FC-PCI bus adapter 25 to provide fast point-to-point communication between the hosts.

In an alternative embodiment, the interconnect network 30 such as a FC fabric provides extra bandwidth for host-to-host communications. In this embodiment, links 28, 38 connect to the interconnect network 30 and the hosts use link 28 and link 38 when available. FC standard software can set priority levels to ensure high priority peer-to-peer requests, but there will still be some arbitration overhead and latency in claiming ownership of the links. For example, if links 28 and 38 are busy transferring data when a write request arrives, that operation must complete before either link is free for arbitration.

If the interconnect 40 ever fails, communication between hosts can be handled using the interconnect network 30. The interconnect network 30 can be implemented by interconnects used in data storage systems such as Fibre Channel, SCSI, InfiniBand, or Ethernet, and the type of interconnect is not essential to the invention. In either embodiment, redundant communication between hosts ensures the data storage system has high availability. See Clark, *IP SANs: A Guide to iSCSI, iFCP, and FCIP Protocols for Storage Area Networks* (2002) and Clark, *Designing Storage Area Networks* (1999) are incorporated herein by reference.

In an embodiment, the data storage subsystems shown in FIG. 1 can be those described in the co-pending U.S. patent application Ser. No. 10/264,603, entitled, Systems and Methods of Multiple Access Paths to Single Ported Storage Devices, filed on Oct. 3, 2002, and incorporated herein by reference. It is understood, however, that other storage device(s) or data storage subsystems could be used instead of the data storage subsystem described in that U.S. patent application.

As shown in FIG. 1, the first host connects, or couples, to the first data storage subsystem through the bus adapter 22, the interface bus 24, the adapter 26, the link 28, the interconnection network 30, and the link 32. To connect to the second data storage subsystem, the first host uses the same I/O path except the data passes through link 34, while the second host uses the same type of I/O components plus link 32 to communicate with the first data storage subsystem, or link 34 to communicate with the second data storage subsystem, or link 36 to the data storage subsystem N.

Each storage device in a data storage subsystem is assigned a logical unit number (LUN) that is an identifier for the storage device. A virtual logical unit number (VLUN) appears as a linear array of data blocks such as 512-byte blocks to a host. In various embodiments, the implementation of a VLUN may be striped (i.e., spread) over multiple RAID groups for added performance, spread over sections of a RAID group for flexibility, or copied on multiple RAID groups for reliability.

Figure 2:
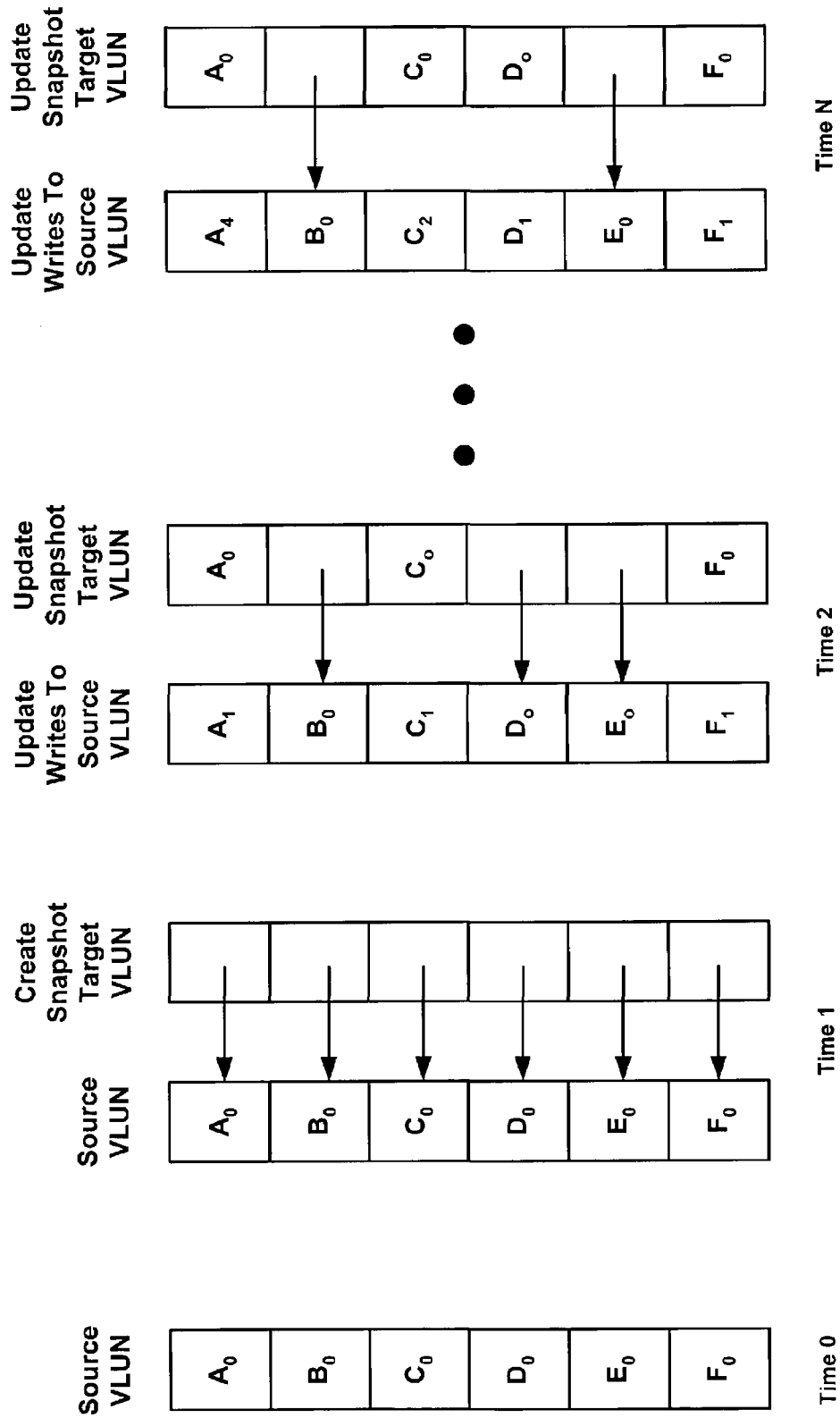
FIG. 2 illustrates the state of data in a source VLUN and a target VLUN before and during a snapshot operation.

FIG. 2 illustrates a pointer table snapshot operation and how the data storage system handles writes on the data contained in the source VLUN. The source VLUN contains the active data (e.g., data block, file, or record) and the target VLUN contains snapshot data. Letters A through F represent the data and the numerical subscript associated with each letter represents the number of writes that have been performed on the data. The invention can be implemented using other techniques of snapshot operations such as bitmaps and multilayer bitmaps.

At time 0, before creating a snapshot the source VLUN contains the data represented by $A_0$, $B_0$, $C_0$, $D_0$, $E_0$, and $F_0$. This will be referred to as the original data and is the data image preserved by the snapshot operation.

At time 1, the snapshot operation allocates space in the target VLUN and generates a map of pointers to the source VLUN. The map of pointers can be stored in any accessible memory, but is typically stored on the storage devices associated with the target VLUN. In this example, the pointers point to the original data $A_0$, $B_0$, $C_0$, $D_0$, $E_0$, and $F_0$ in the source VLUN when the snapshot is created. This preserves the original data without requiring the system to write a copy to the target VLUN that is shown in FIG. 2 as not containing any data.

Between time 1 and time 2, the data storage system receives requests to modify the data, e.g., $A_0$ to $A_1$, $C_0$ to $C_1$, and $F_0$ to $F_1$. To preserve the original data $A_0$, $C_0$, and $F_0$, the storage controller or host writes the original data to the target VLUN and drops the corresponding pointer to the source VLUN. In contrast, the storage controller or host does not modify the original data $B_0$, $D_0$, and $E_0$ as indicated by the corresponding pointers that still point to the source VLUN.

Between time 2 and time N, the data storage system receives further requests to modify certain data, for example, $A_1$ to $A_2$ to $A_3$ to $A_4$, $C_1$ to $C_2$, and $D_0$ to $D_1$. To preserve the original data $D_0$, the storage controller or host writes the original data $D_0$ to the target VLUN and drops the corresponding pointer. Although the data represented by A and C was modified several times between time 1 and time N, the target VLUN only preserves the original values, $A_0$ and $C_0$, representing the original data at the instant of the snapshot. The storage controller or host does not modify the original data $B_0$ and $E_0$ by time N so corresponding pointers to the source VLUN remain.

Figure 3:
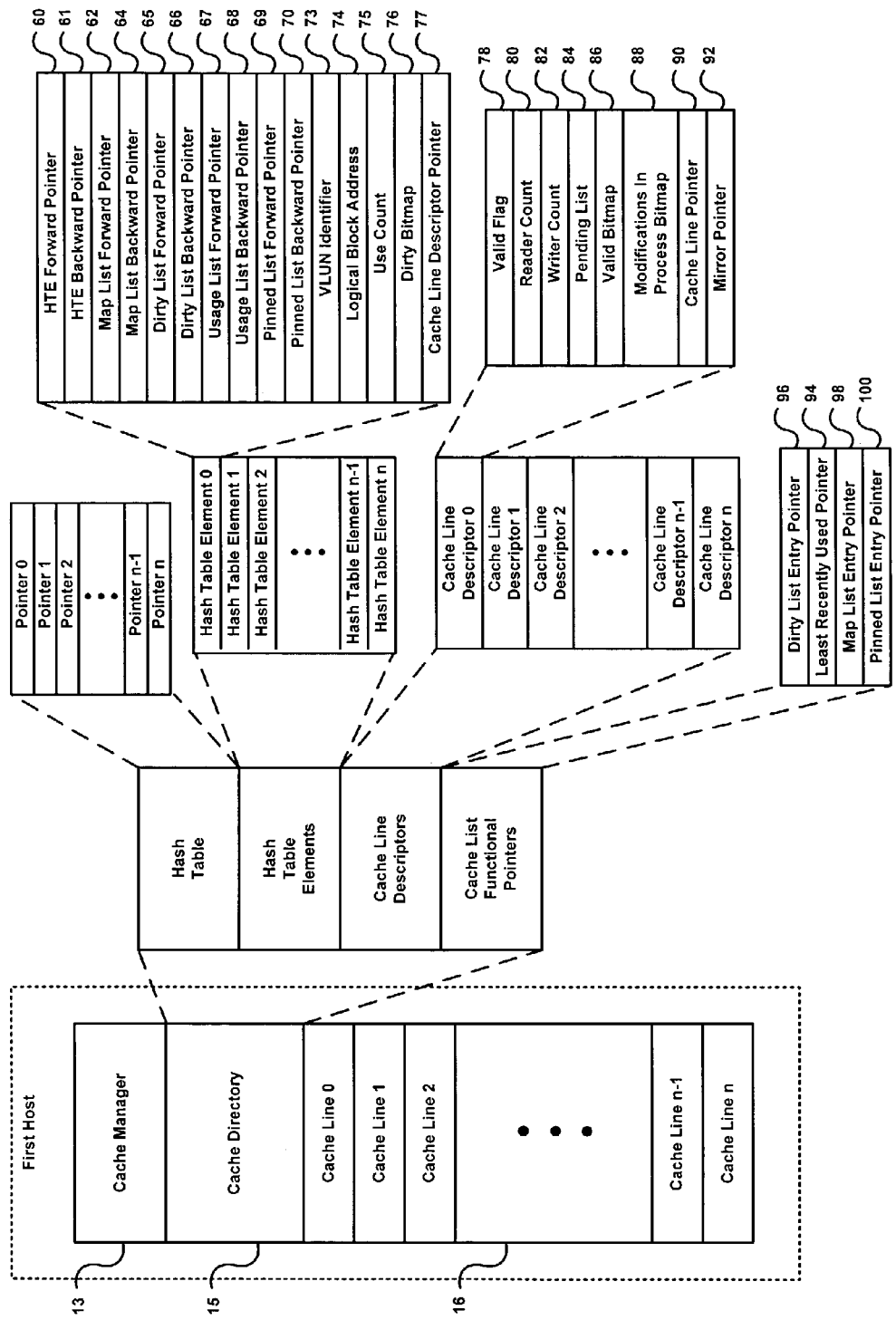
FIG. 3 is a diagram of the first host cache memory and the details of the cache directory.

FIG. 3 illustrates further details of the cache lines 16 and the cache directory 15. The cache lines 0 through n facilitate storing, searching, and retrieving of data. Each cache line is a defined space for data in cache memory. Preferably, the cache lines are of an equal size such as 64K bytes. In an embodiment, the cache directory 15 includes a search structure such as a hash table, search elements such as hash table elements 0–n, cache line descriptors 0–n, and cache list functional pointers 94, 96, 98, and 100. A hashing function not shown will take input(s) also termed a key and generate a hash value as a result that is used to index a hash table. The hash table is an array of pointers, for example, hash table pointers 0–n. The index identifies each hash table pointer by position in the hash table. A hash table pointer is used to point to a hash table element in a linked list of hash table elements referred to as a hash line.

In an embodiment, each hash table element (HTE) includes the following set of items:

An HTE forward pointer 60 that points to the next HTE in the hash line.

An HTE backward pointer 61 that points to the previous HTE in the hash line or the hash table if the HTE is the initial HTE in a hash line.

A map list forward pointer 62 that points to the next HTE in a linked list of HTEs that also point to the same cache line descriptor.

A map list backward pointer 64 that points to the previous hash table element in the linked list of HTEs that also points to the same cache line descriptor.

A dirty list forward pointer 65 that points to the next HTE in a linked list of HTEs associated with dirty data. Dirty data is modified data that has not been destaged from volatile memory to nonvolatile memory.

A dirty list backward pointer 66 that points to the previous HTE in the linked list of HTEs associated with dirty data.

A usage list forward pointer 67 that points to the next HTE in a linked list of HTEs used to determine the LRU data.

A usage list backward pointer 68 that points to the previous HTE in the linked list of HTEs used to determine the LRU data.

A pinned list forward pointer 69 that points to the next HTE in a linked list of HTEs associated with dirty data whose destination VLUN(s) is not available for destaging.

A pinned list backward pointer 70 that provides a pointer to the previous HTE in the linked list of HTEs associated with dirty data whose destination VLUN(s) is not available for destaging.

A VLUN identifier 73 that provides a number of the VLUN of the data that resides in the associated cache line.

The logical block address 74 of the data in VLUN identifier 73 that resides in the associated cache line.

A use count 75 that indicates how many applications are using the data. If the use count goes to zero, the data goes on the linked list of HTEs for LRU data.

A dirty bitmap 76 that is a map of data in the cache line that has not been destaged.

A cache line descriptor pointer 77 that points to the cache line descriptor.

In an embodiment, each of cache line descriptors 0–n includes the following items:

A valid flag 78 set to indicate that the VLUN and LBA fields are valid. If not set, the flag indicates that the present VLUN and LBA fields are invalid and the data in the cache line is not reliable data.

A reader count 80 to indicate the number of applications that are reading the associated cache line.

A writer count 82 to indicate the number of applications that are currently writing the associated cache line although not the same data.

A pending list 84 to indicate the read and write operations that are pending to the cache line, specifically to data that are already being read or written. In an embodiment, the pending list 84 is a first-in-first-out list. In another embodiment, the pending list 84 is policy based whose priority is user dependent.

A valid bitmap 86 to indicate the valid data within the cache line.

A modification in process bitmap 88 to indicate the data within the cache line that an application is modifying.

A cache line pointer 90 to point to the cache line where data is stored.

A mirror pointer 92 that points to a mirror copy of the data.

In an embodiment, the cache list functional pointers include the following items:

Dirty list entry pointer 96 points to an HTE in a linked list of HTEs that identify cache line descriptors with data that have not been destaged.

Least-recently-used pointer 94 is a pointer to the least-recently-used HTE.

Map list entry pointer 98 points to an HTE in a linked list of HTEs that point to the same cache line descriptor.

Pinned list entry pointer 100 points to an HTE in a linked list of HTEs that identifies cache line descriptors associated with dirty data that cannot be destaged.

The cache memory management system converts a request for specific data types, contained in linked lists of HTEs, to an input to a list of cache line functional pointers. The cache list functional pointers point directly to the specific linked lists of HTEs that are associated with cache lines containing the requested data, thus eliminating the need to search hash table elements whose associated cache lines do not contain the requested data.

Figure 4:
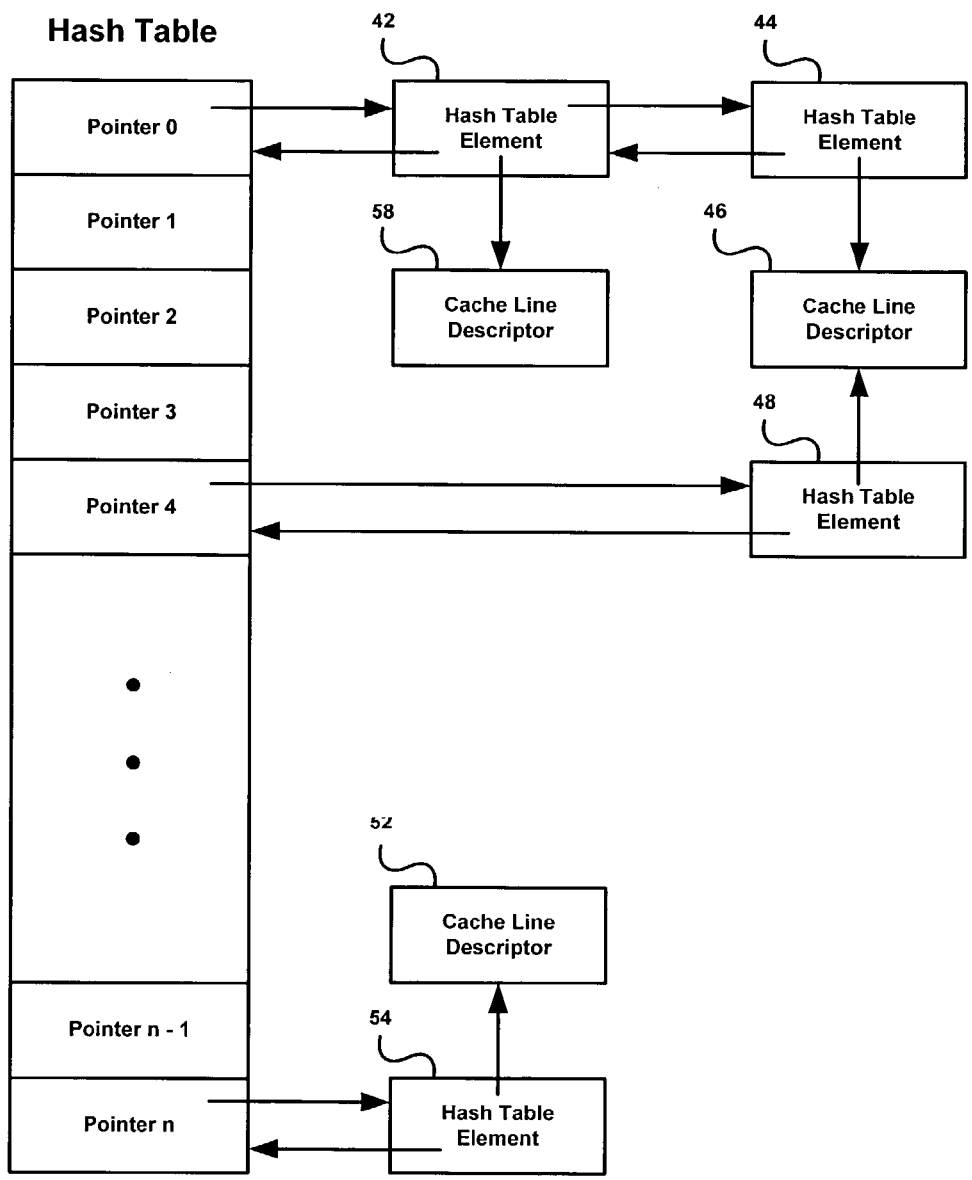
FIG. 4 illustrates details of a cache directory including a hash table and associated linked lists of hash table elements and cache line descriptors.

FIG. 4 illustrates that the cache directory 15 organizes data in cache memory so it can be rapidly retrieved and pointed to by multiple applications. The cache directory 15 includes a hash table, hash table elements (HTEs), and cache line descriptors (CLDs). The system passes a key such as a VLUN and the logical block address to a hashing function (FIG. 10) that generates a hash value that is used to index the hash table. The hash table includes an array of pointers that point to the linked lists of HTEs. For brevity, we use the symbol "__>" to represent a pointer. Each HTE includes the items 60, 61, 62, 64, 65, 66, 67, 68, 69, 70, 73, 74, 75, 76, and 77 shown in FIG. 3. As shown, the HTEs are arranged in doubly-linked lists. For example, one doubly-linked list contains a forward link of pointer 0-->HTE 42-->HTE 44 and a backward link of HTE 44-->HTE 42-->pointer 0. Similarly, another doubly-linked list contains a forward link of pointer n-->HTE 54 and a backward link of HTE 54-->pointer n. Further, multiple HTEs can point to a single CLD while each CLD points to a single cache line. For example, HTE 44 and HTE 48-->CLD 46 while HTE 42-->CLD 58 and HTE 54-->CLD 52. Thus, each CLD associates with one or more HTEs and has a one-to-one association with a cache line in the cache memory 20 (FIG. 1).

Figure 5:
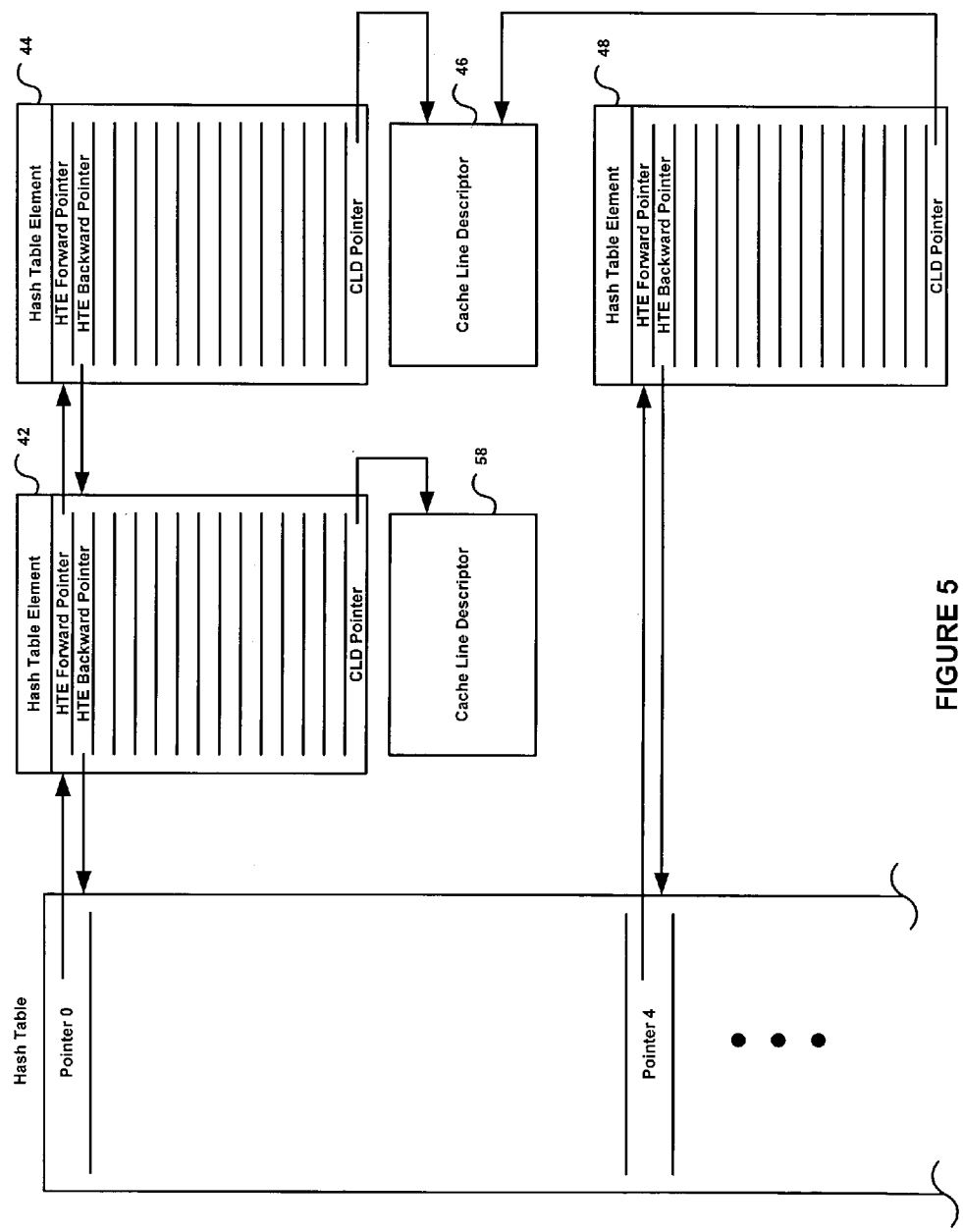
FIG. 5 illustrates hash table pointers that point to linked lists of hash table elements and associated cache line descriptors.

FIG. 5 illustrates hash table pointers that point to two linked lists of HTEs. Pointer 0-->HTE 42 in a doubly-linked list of HTEs. The pointer 0 and HTE 42 and HTE 44 form a hash line, referred to as hash line 0. The HTE forward pointer of HTE 42-->HTE 44, i.e., the next HTE that was allocated in hash line 0. In this illustration, the system has not allocated other HTEs in hash line 0. As a result, the HTE forward pointer of HTE 44 in hash line 0 does not point forward to another HTE and is said to be a null pointer. The HTE backward pointer of HTE 44 points back to HTE 42 in hash line 0. The HTE backward pointer of HTE 42-->pointer 0. HTE 42-->CLD 58 and HTE 44-->CLD 46 with their respective CLD pointers. Similarly, hash line 4 is made up of pointer 4 and HTE 48. HTE 48 uses its CLD pointer to point to CLD 46 as does HTE 44 in hash line 0.

Figure 6:
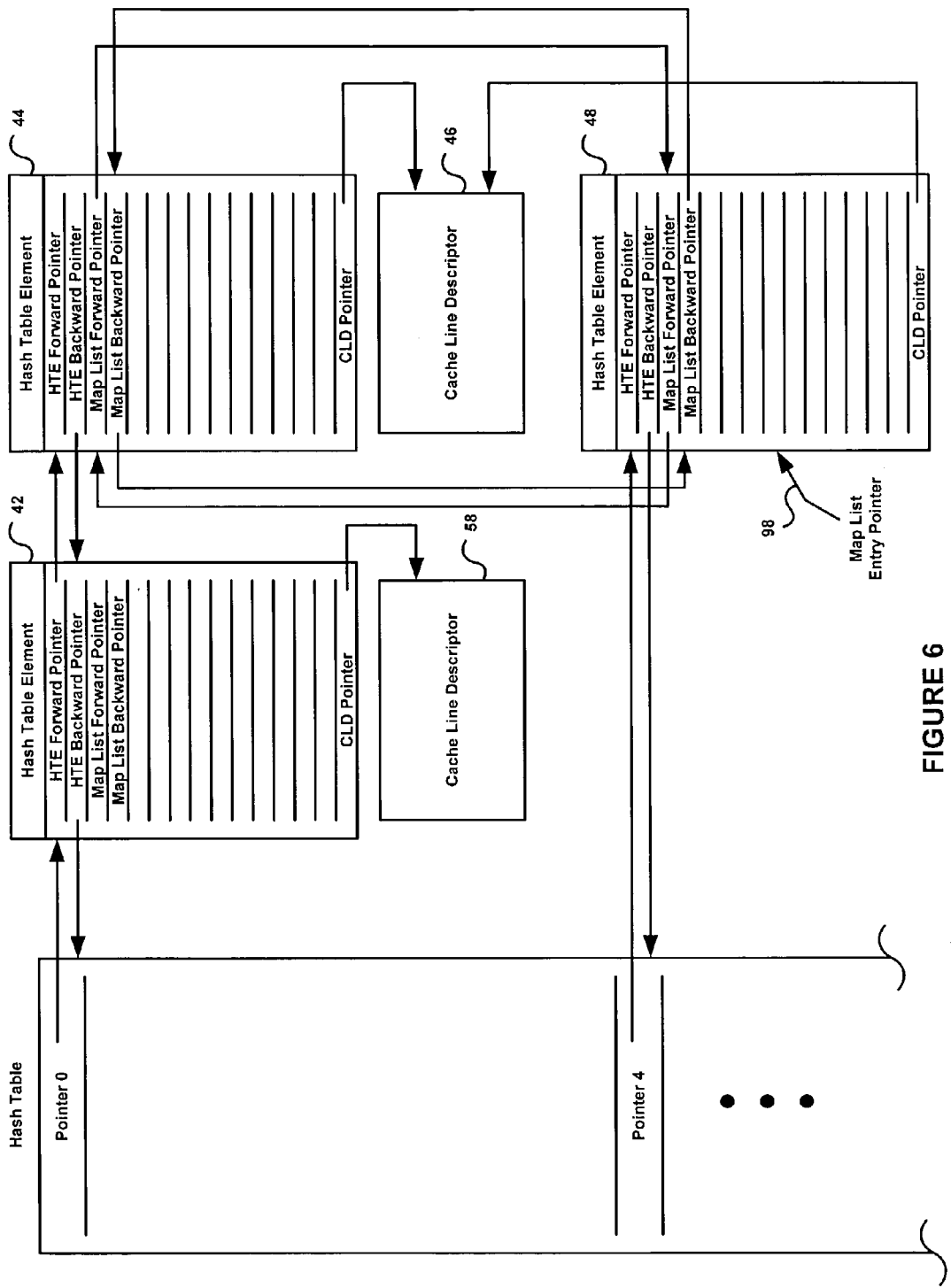
FIG. 6 illustrates a linked list of hash table elements that point to the same cache line descriptor through the use of map list pointers and cache line descriptor pointers.

FIG. 6 illustrates a linked list of hash table elements pointing to the same cache line descriptor. This linked list of HTEs is made up of HTE 44 from hash line 0 and the HTE 48 of hash line 4. The map list forward pointer of HTE 44-->HTE 48. Since there are only two HTEs that point to the same CLD 46, the map list forward pointer of HTE 48-->HTE 44. The map list backward pointer of HTE 48-->HTE 44. The map list backward pointer of HTE 44-->HTE 48.

Also shown is a map list entry pointer 98 that permits the system to directly access this linked list without needing to search through hash table elements that do not point to CLD 46.

As a new HTE (not shown) is allocated that points to the same CLD 46, a pair of existing HTE forward and backward pointers are redirected to point to the new HTE. For example, the map list forward pointer of HTE 44-->new HTE. The map list forward pointer of the new HTE-->HTE 48. Similarly, the map list backward pointer of HTE 48--> new HTE. The map list backward pointer of new HTE--> HTE 44. Thus, the new HTE's forward and backward pointers will take the place of the redirected pointers in the linked list.

Figure 7:
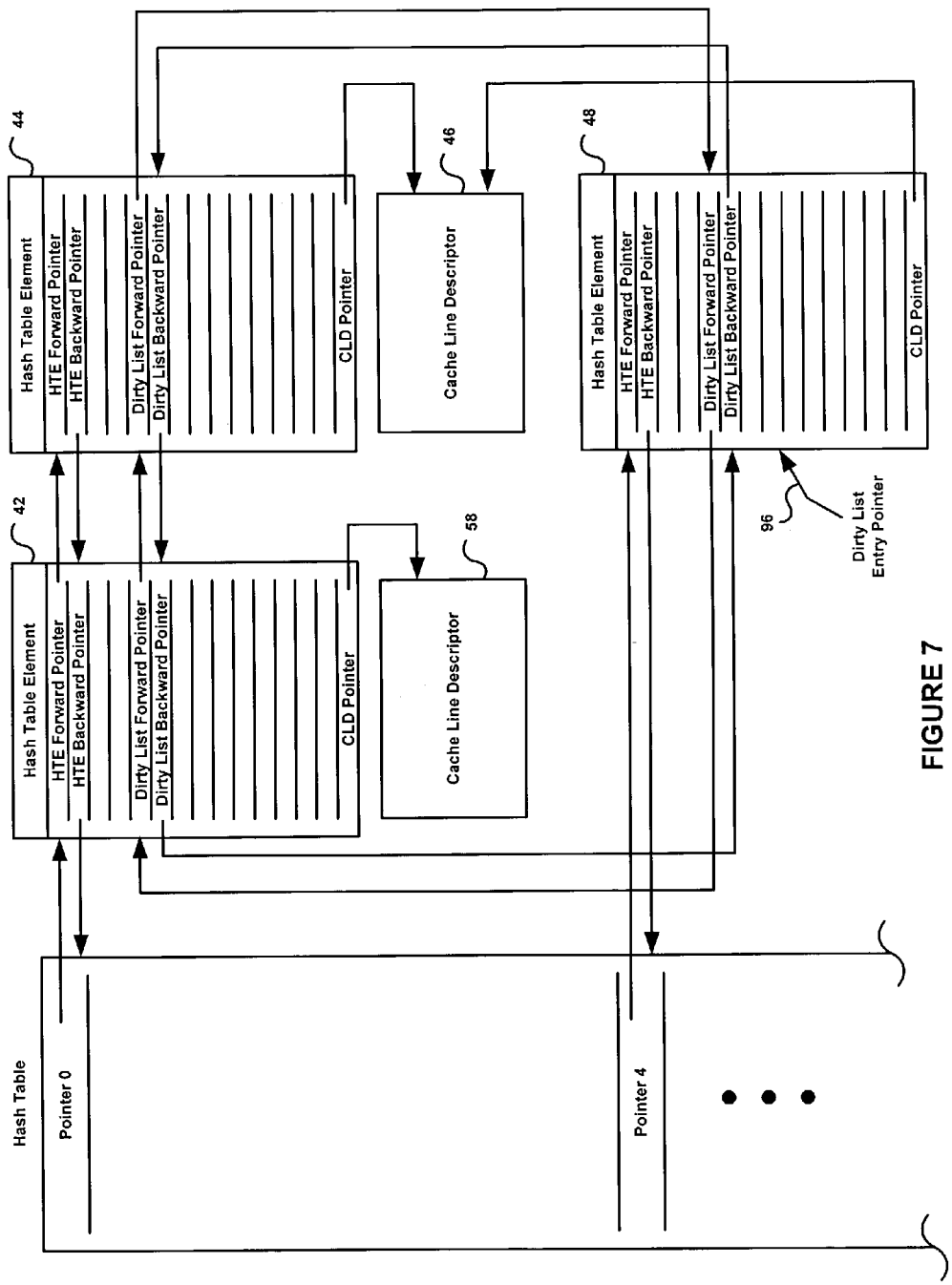
FIG. 7 illustrates a linked list of hash table elements whose associated cache lines contain data requiring destaging.

FIG. 7 illustrates a linked list of HTEs whose associated cache lines contain data requiring destaging, that is, dirty data. It is assumed that HTE 42, HTE 44, and HTE 48 are associated with dirty data in their respective cache lines. The dirty list forward pointer of HTE 42-->HTE 44. The dirty list forward pointer of HTE 44-->HTE 48. The dirty list forward pointer of HTE 48-->HTE 42. The dirty list backward pointer of HTE 42-->HTE 48. The dirty list backward pointer of HTE 48-->HTE 44. The dirty list backward pointer of HTE 44-->HTE 42.

In order to speed the access to the linked list of HTEs associated with dirty data, a dirty list entry pointer 96 is maintained in the cache directory as dirty data are created. This pointer eliminates the need to search through HTEs that are not associated with dirty data.

If a new HTE (not shown) is allocated that is associated with dirty data, a pair of existing HTE forward and backward pointers are redirected to point to the new HTE. For example, the dirty list forward pointer of HTE 42-->new HTE. The dirty list forward pointer of the new HTE-->HTE 44. The dirty list forward pointer of HTE 44-->HTE 48. The dirty list forward pointer of HTE 48-->HTE 42.

Similarly, the dirty list backward pointer of HTE 42--> HTE 48. The dirty list backward pointer of HTE 48-->HTE 44. The dirty list backward pointer of HTE 44-->new HTE. The dirty list backward pointer of the new HTE-->HTE 42. Thus, the new HTE's forward and backward pointers will take the place of the redirected pointers in the linked list.

Figure 8:
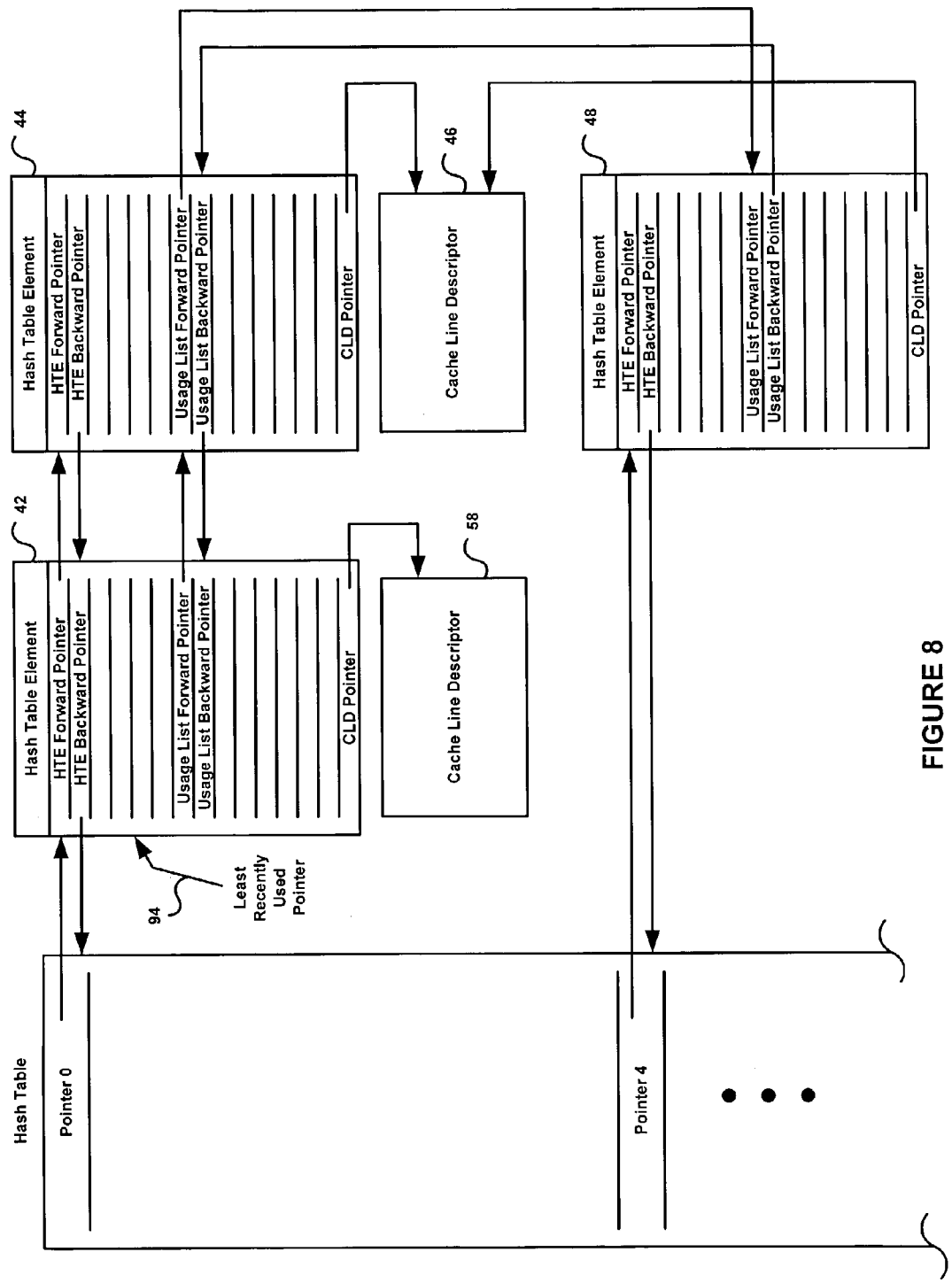
FIG. 8 illustrates a linked list of hash table elements that include usage list pointers that identify the least-recently-used (LRU) hash table element.

FIG. 8 illustrates a linked list of HTEs that include the usage list pointers that identify least-recently-used data. A least-recently used pointer 94 is maintained in the cache directory that points to the least-recently-used HTE. Conventional algorithms can be employed to determine which HTEs may be de-allocated in order to free cache space for other applications requesting data. For example, a time stamp may be appended to each HTE to indicate the length of time that the data has resided in cache memory. In another example, the rate at which an HTE is accessed is maintained as an indication of the frequency of usage of the associated data. In any case, the HTEs are ranked and maintained in order of least-recently-used pointer to most-recently-used and linked through the redirection of usage list forward and usage list backward pointers. One or more HTEs can be inserted into or deleted from the linked list to maintain the order of least-recently-used pointer to most-recently-used. The least-recently-used pointer 94-->HTE 42. The usage list forward pointer of HTE 42-->HTE 44. The usage list forward pointer of HTE 44-->HTE 48. The usage list forward pointer of HTE 48 is a null pointer. Similarly, the usage list backward pointer of HTE 48-->HTE 44. The usage list backward pointer of HTE 44-->HTE 42. The usage list backward pointer of HTE 42-->pointer 0 in the hash table.

Figure 9:
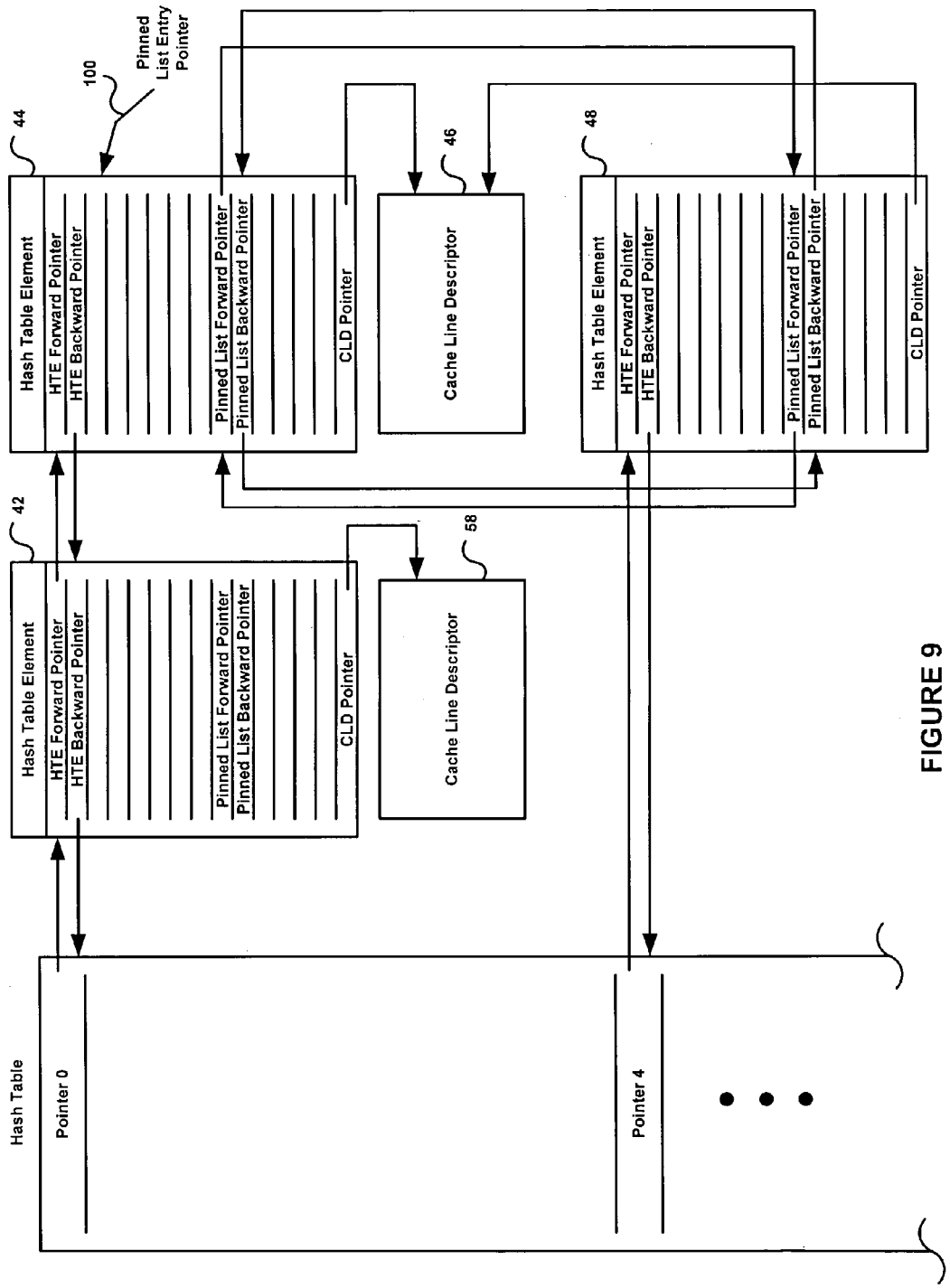
FIG. 9 illustrates a linked list of hash table elements that include pinned list pointers that indicate associated cache lines that contain data that need to be destaged but whose VLUNs are unavailable.

FIG. 9 illustrates a linked list of HTEs for pinned data, that is, HTEs having dirty data that cannot be destaged because the associated VLUNs are unavailable. Let's assume that only CLD 46, pointed to by HTE 44 and HTE 48, has pinned data. The pinned list forward pointer of HTE 44-->HTE 48. The pinned list forward pointer of HTE 48-->HTE 44. The pinned list backward pointer of HTE 48-->HTE 44. The pinned list backward pointer of HTE 44-->HTE 48.

As a further example, as a new HTE (not shown) is allocated that associates with pinned data, a pair of existing HTE forward and backward pointers from HTEs in this linked list are redirected to point to the new HTE as described earlier in connection with FIG. 6. The new HTE's forward and backward pointers will take the place of the redirected pointers in the linked list. Also shown is a pinned list entry pointer 100 that permits the cache memory management system to directly access this linked list without the need to search through hash table elements that are not associated with pinned data.

Figure 10:
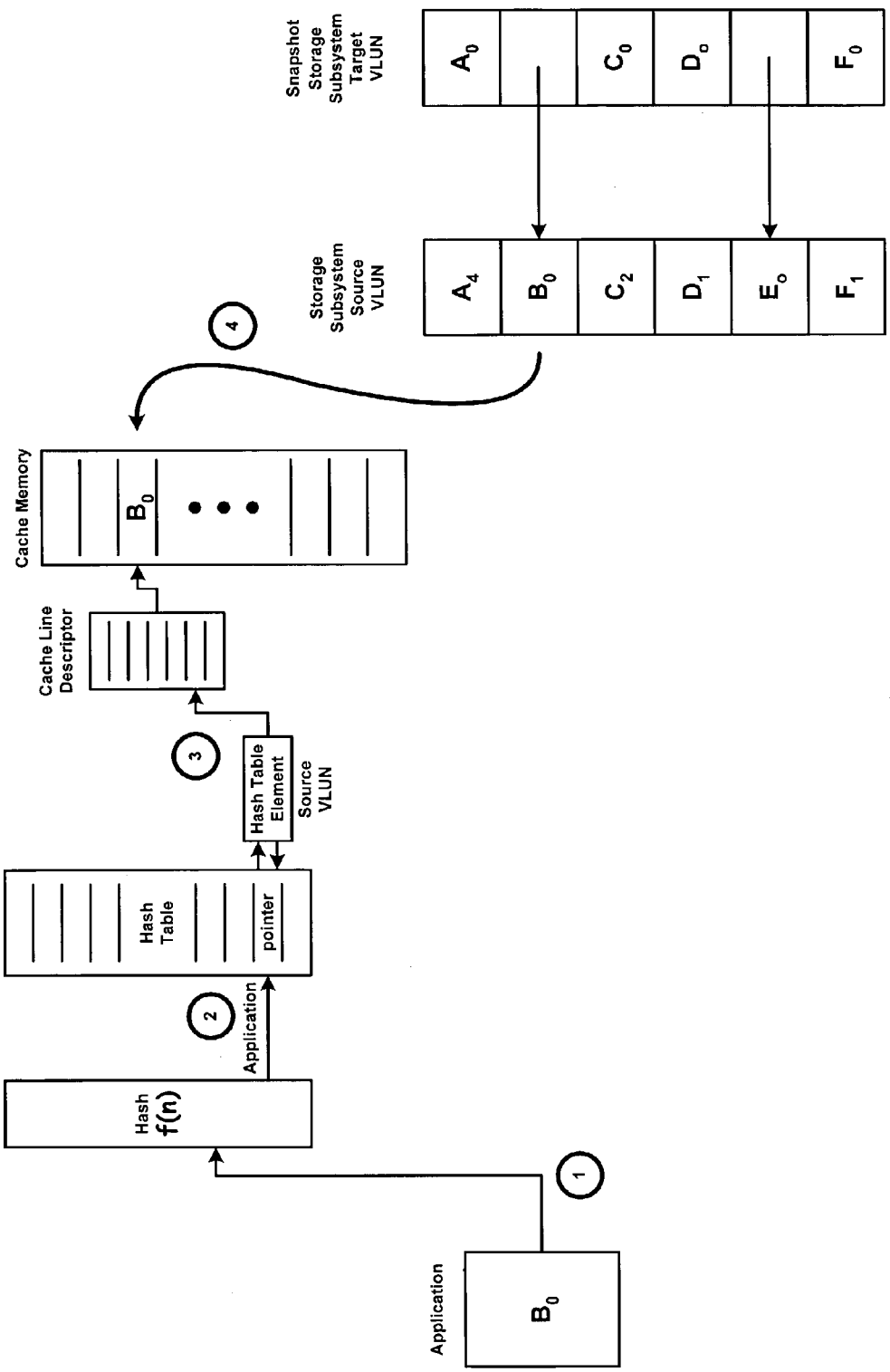
FIG. 10 illustrates an embodiment of a data storage system with a snapshot VLUN and a request for data from an application where the data does not initially reside in cache memory and must be staged from a source VLUN.
Figure 11:
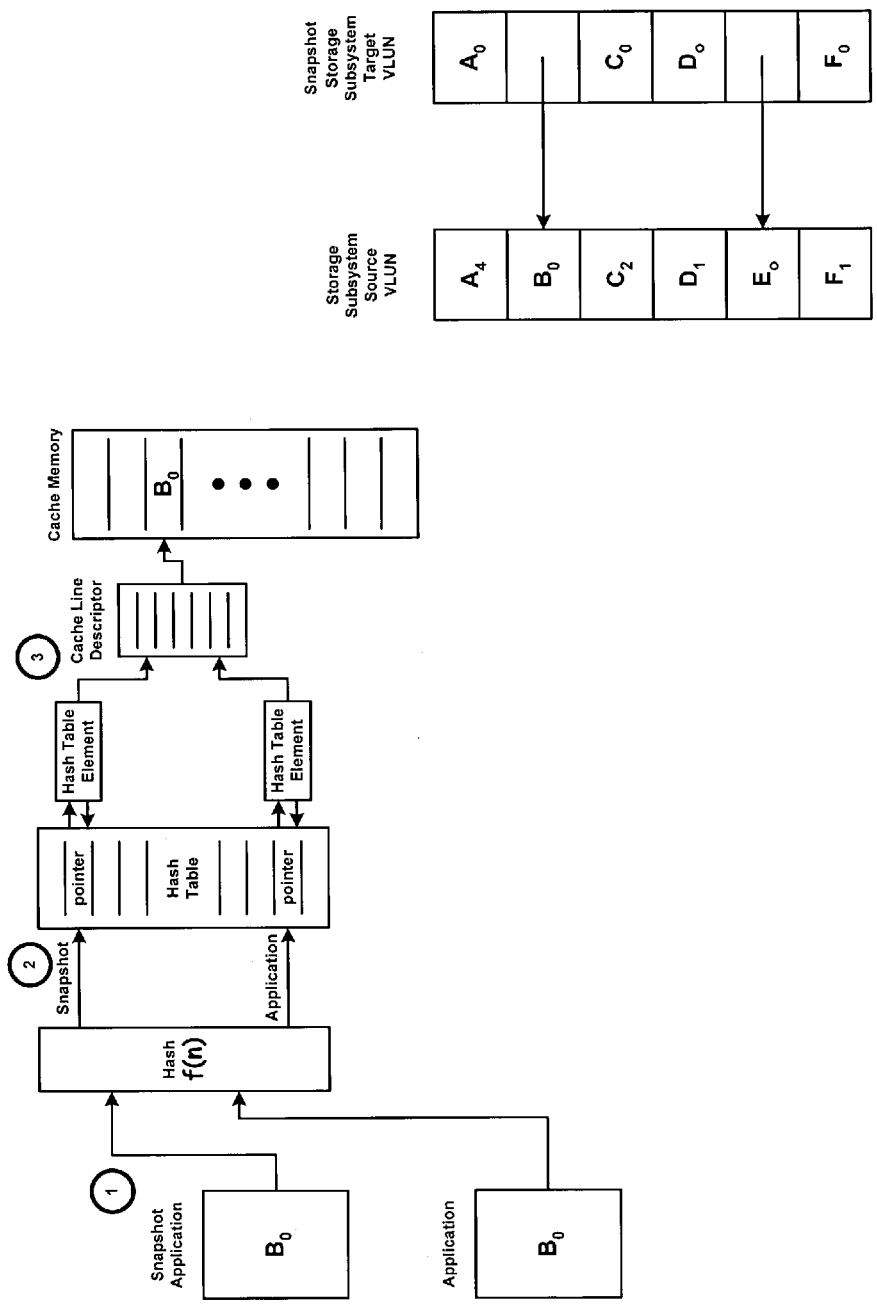
FIG. 11 illustrates an embodiment of the data storage system at a later time where a snapshot application and primary application point to the same data $B_0$ in cache memory and the associated VLUNs.
Figure 12:
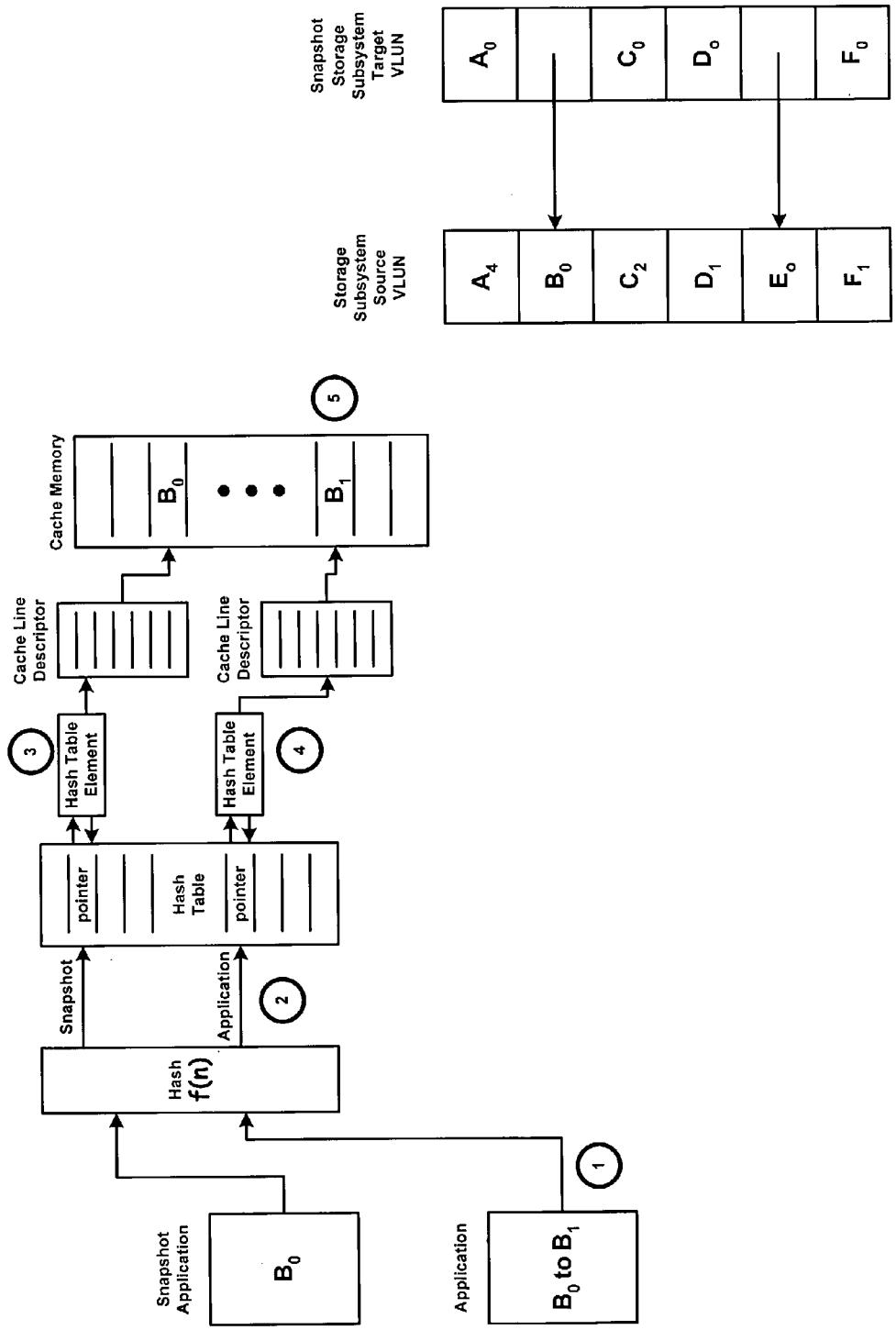
FIG. 12 illustrates an embodiment of the data storage system where the application writes updated data to cache.

FIGS. 10–12 illustrate a data storage system with a snapshot. It shows how the system handles requests for data not in cache, operates on data in cache, writes updated data to cache, and destages the original and updated data to the VLUNs.

FIG. 10 illustrates an embodiment of a data storage system with a snapshot VLUN and a request for data from an application (e.g., a user application) where the data does not initially reside in cache memory and must be staged from the source VLUN. At step 1, the application requests data $B_0$. The system turns this request into an input to a hashing function f(n). At step 2, the system outputs an address to the hash table. The system determines that the data $B_0$ is not in cache memory, that is, a cache miss. Thus, at step 3, the system allocates an HTE and a CLD that associates with an available cache line in the cache memory. At step 4, the system stages data $B_0$ from the storage subsystem source VLUN to the allocated cache line without changing the snapshot data in the target VLUN.

FIG. 11 illustrates a snapshot operation and the associated VLUNs where a snapshot application and the application operate on the same data $B_0$ in cache memory. At step 1, the snapshot application provides an input to the hashing function f(n). At step 2, the system outputs an address to the hash table. The system determines that the data $B_0$ is in cache memory, that is, a cache hit. Thus, at step 3, the system allocates a new HTE for the snapshot application that points to the same CLD pointing to the same cache line containing the data $B_0$ in the cache memory. Thus, the system converts multiple data requests for the same data from multiple applications, into pointers to the same cache line descriptor pointing to the same cache line.

FIG. 12 illustrates an embodiment of the snapshot operation where the application initiates an update to the data in cache. At step 1, the application initiates an update to the data $B_0$, that is, $B_0$ to $B_1$. The system turns this into a new input to the hashing function f(n). At step 2, the system outputs a new address to the hash table. At step 3, the system will modify the snapshot HTE's VLUN identifier to address the target VLUN for $B_0$. At step 4, the system will allocate a new HTE CLD pointer for the source VLUN and a new OLD to reserve an available cache line for the new data $B_1$. At step 5, the application updates the original data $B_0$, that is, $B_0$ to $B_1$, and the system writes the new data $B_1$ into the allocated cache line. The system does not change the snapshot data in the target VLUN.

Figure 13:
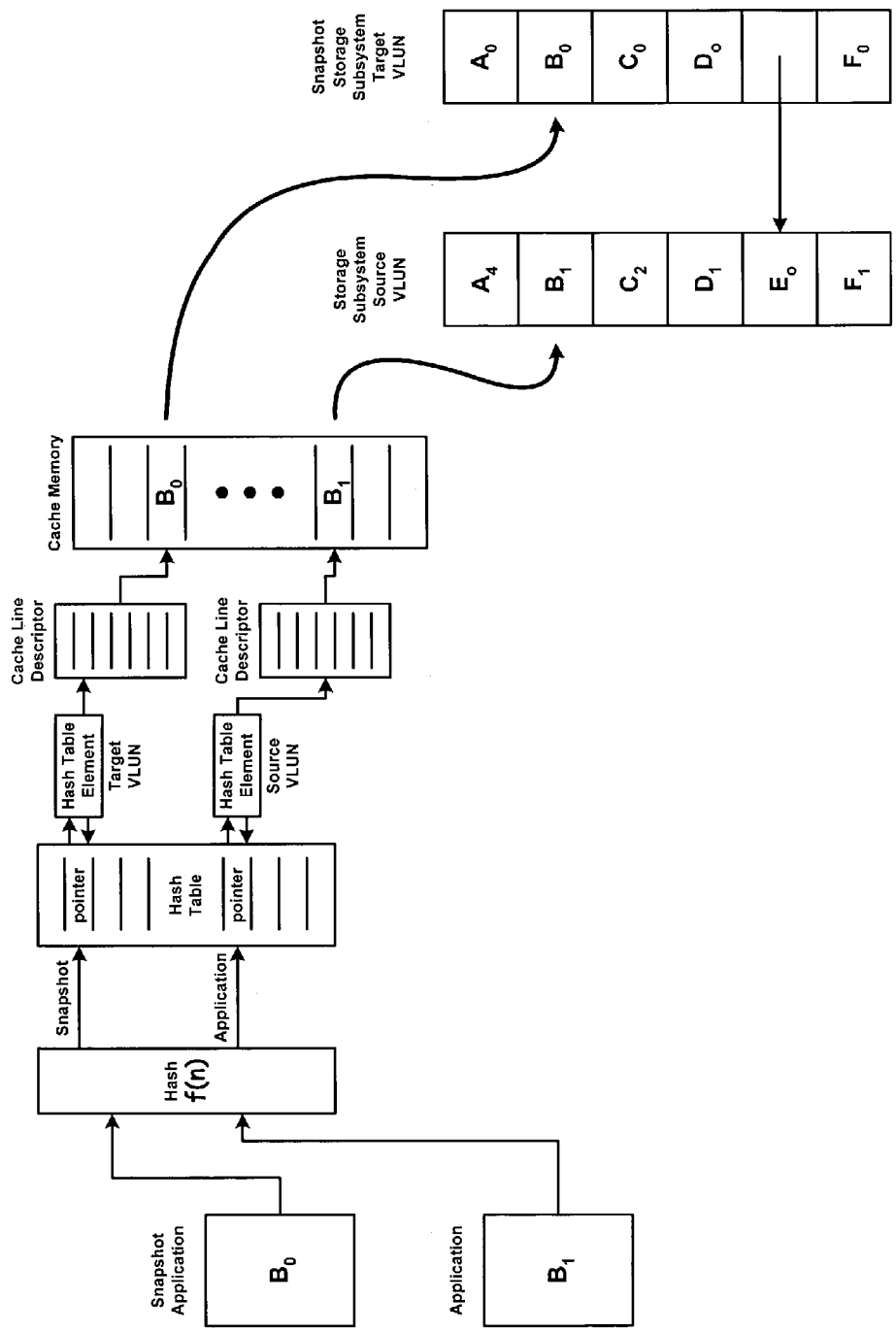
FIG. 13 illustrates an embodiment of the data storage system where the original data is destaged from cache memory to the target VLUN and the updated data is destaged from cache memory to the source VLUN.

FIG. 13 illustrates an embodiment of the data storage system where the data is destaged from cache memory to the source VLUN and target VLUN. The update $B_0$ to $B_1$ was the first change to the original image of the data $B_0$. In order to preserve this image, $B_0$ is destaged to the target VLUN and the $B_0$ pointer from the target VLUN to the source VLUN is removed. FIG. 13 also illustrates that the updated data $B_1$ is destaged from the cache memory to the source VLUN to maintain data consistency. In an embodiment, the destaging of data $B_0$ precedes the destaging of data $B_1$. In another embodiment, the destaging of data $B_1$ precedes the destaging of data $B_0$. The destaging of $B_0$ occurs independently from the $B_1$ write operation.

The present invention was primarily described as using a hashing function to locate the pointers in a hash table to point to hash table elements and in turn cache line descriptors associated with cache lines in a cache memory. However, the present invention is not limited to searching for hash table elements in this manner only. The invention also encompasses a cache memory management system in a data storage system that includes a cache directory including search elements and cache line descriptors, a cache manager that receives a request for data from an application and uses search algorithms to locate the search element, wherein the search element points to a first cache line descriptor that has a one-to-one association with a first cache line. Cormen, *Introduction to Algorithms* (2001) and Knuth, *The Art of Computer Programming*, Volume 3, Sorting and Searching (1998) describe suitable algorithms and are hereby incorporated herein by reference.

What is claimed is:

1. A cache memory management system in a data storage system, comprising:
   a cache memory including a cache directory including a hash table, hash table elements, and cache line descriptors and a plurality of cache lines, wherein a first cache line descriptor has a one-to-one association with a first cache line; and
   a cache manager using a hashing function to convert a first request for data to index to a first hash table pointer and a second request for data to index to a second hash table pointer in the hash table, wherein the first hash table pointer points to a first hash table element and the second hash table pointer points to a second hash table element of a linked list of hash table elements in the cache directory, wherein the first hash table element and the second hash table element point to the first cache line descriptor in the cache directory.

2. The system of claim 1, further comprising a source VLUN and a target VLUN, wherein the cache manager determines the requested data is not in the cache memory, and stages the requested data from the source VLUN to the first cache line.

3. The system of claim 1, wherein the cache manager receives the second request for data from a snapshot application.

4. The system of claim 1, wherein the cache manager receives a request to store updated data, wherein the cache manager converts the request to index to a third hash table pointer that points to a third hash table element that points to a second cache line descriptor associated with a second cache line for storing the updated data and writes the updated data to the second cache line.

5. The system of claim 4, wherein the data storage system writes the updated data from the second cache line and the data from the first cache line to one or more nonvolatile storage devices.

6. The system of claim 4, further comprising a source VLUN and a target VLUN, wherein the data storage system destages the updated data from the second cache line to the source VLUN and destages the data from the first cache line to the target VLUN.

7. The system of claim 6, wherein the data storage system destages the updated data from the second cache line to the source VLUN before the system destages the data from the first cache line to the target VLUN.

8. The system of claim 6, wherein the data storage system destages the updated data from the second cache line to the source VLUN after the system destages the data from the first cache line to the target VLUN.

9. The system of claim 6, wherein the data storage system destages the data and the updated data from the first and second cache lines to the target and source VLUNs as a background activity.

10. The system of claim 2, further comprising a host coupled to one or more data storage subsystems, wherein the host contains the cache manager and cache memory, and the one or more data storage subsystems correspond to the source VLUN and the target VLUN.

11. The system of claim 2, further comprising a host coupled to one or more data storage subsystems, and wherein the host is coupled to the cache manager and the cache memory, and the one or more data storage subsystems correspond to the source VLUN and the target VLUN.

12. The system of claim 2, further comprising a data storage subsystem coupled to the cache manager, the cache memory, the source VLUN, and the target VLUN.

13. The system of claim 1, 2, 3, 4, 5, 6, 7, 8, 9, 10, 11, or 12, wherein each of the first and second hash table elements include a cache line descriptor pointer and a hash table element forward pointer, a hash table element backward pointer, a map list forward pointer, a map list backward pointer, a dirty list forward pointer, a dirty list backward pointer, a usage list forward pointer, a usage list backward pointer, a pinned list forward pointer, a pinned list backward pointer, a VLUN identifier, a logical block address, a use count or a dirty bitmap.

14. The system of claim 1, 2, 3, 4, 5, 6, 7, 8, 9, 10, 11, or 12, wherein the first cache line descriptor includes a cache line pointer and a valid flag, a reader count, a writer count, a pending list, a valid bitmap, a modification in process bitmap, or a mirror pointer.

15. The system of claim 1, 2, 3, 4, 5, 6, 7, 8, 9, 10, 11, or 12, further comprising cache list functional pointers that point to the first hash table element, wherein the cache list functional pointers include a dirty list entry pointer, a least-recently-used pointer, a map list pointer, or a pinned list entry pointer.

16. A cache memory management system in a data storage system, comprising:

a cache memory including a cache directory including search elements and cache line descriptors and a plurality of cache lines, wherein a first cache line descriptor has a one-to-one association with a first cache line;

a cache manager receiving a plurality of requests for data and using a search algorithm to locate a first search element and a second search element that point to the first cache line descriptor a source VLUN that includes a storage space corresponding to the first cache line; and a target VLUN pointing to the storage space of the source VLUN corresponding to the first cache line.

17. The system of claim 16, wherein the cache manager determines the requested data is not in the cache memory and stages the requested data from the source VLUN to the first cache line.

18. The system of claim 16, wherein the cache manager receives a request to store updated data, wherein the cache manager converts the request to locate a third search element that points to a second cache line descriptor associated with a second cache line for storing the updated data and writes the updated data to the second cache line.

19. The system of claim 18, wherein the data storage system writes the updated data from the second cache line and the data from the first cache line to one or more nonvolatile storage devices.

20. The system of claim 18, wherein the data storage system destages the updated data from the second cache line to the source VLUN and destages the data from the first cache line to the target VLUN, wherein the target VLUN no longer points to the storage space of the source VLUN corresponding to the first cache line.

21. The system of claim 20, wherein the data storage system destages the updated data from the second cache line to the source VLUN before the system destages the data from the first cache line to the target VLUN.

22. The system of claim 20, wherein the data storage system destages the updated data from the second cache line to the source VLUN after the system destages the data from the first cache line to the target VLUN.

23. The system of claim 20, wherein the data storage system destages the data and updated data from the first and second cache lines to the target and source VLUNs as a background activity.

24. The system of claim 16, further comprising a host coupled to one or more data storage subsystems, wherein the host contains the cache manager and the cache memory, and the one or more data storage subsystems correspond to the source VLUN and the target VLUN.

25. The system of claim 16, further comprising a host coupled to one or more data storage subsystems, and wherein the host is coupled to the cache manager and the cache memory, and the one or more data storage subsystems correspond to the source VLUN and the target VLUN.

26. The system of claim 16, further comprising one or more data storage subsystems that include the cache manager, the cache memory, the source VLUN, and the target VLUN.

27. The system of claim 16, 17, 18, 19, 20, 21, 22, 23, 24, 25, or 26, wherein the first and second search elements each include a cache line descriptor pointer and a search element forward pointer, a search element backward pointer, a map list forward pointer, a map list backward pointer, a dirty list forward pointer, a dirty list backward pointer, a usage list forward pointer, a usage list backward pointer, a pinned list forward pointer, a pinned list backward pointer, a VLUN identifier, a logical block address, a use count, or a dirty bitmap.

28. The system of claim 16, 17, 18, 19, 20, 21, 22, 23, 24, 25, or 26, wherein the first cache line descriptor includes a cache line pointer and a valid flag, a reader count, a writer count, a pending list, a valid bitmap, a modification in process bitmap, a cache line pointer, a mirror pointer.

29. The system of claim 16, 17, 18, 19, 20, 21, 22, 23, 24, 25, or 26, further comprising cache list functional pointers that point to the first search element, wherein the cache list functional pointers include a dirty list entry pointer, a least-recently-used pointer, a map list pointer, or a pinned list entry pointer.

30. A method in a cache memory management system, comprising:

converting a first request for data to a first input to a hashing function;

addressing a hash table based on a first index output from the hashing function;

searching the hash table elements pointed to by the first index for the data;

determining the data is not in cache memory;

allocating a first hash table element and a first cache line descriptor that associates with a first cache line in cache memory;

staging the data from a source VLUN to the first cache line:

converting a second request from a snapshot application for the data to a second input to the hashing function;

addressing the hash table based on a second index output from the hashing function;

searching the hash table elements pointed to by the second index for the data;

determining the data is in cache memory; and allocating a second hash table element that points to the first cache line descriptor.

31. The method of claim 30, further comprising the steps of:

requesting to store updated data;

converting the request into a third input to the hashing function;

outputting a third index to the hash table;

allocating a third hash table element and a second cache line descriptor to point to a second cache line for the updated data;

updating the data; and writing the updated data into the second cache line.

32. The method of claim 31, further comprising writing the updated data from the second cache line and the data from the first cache line to one or more nonvolatile storage devices.

33. The method of claim 31, further comprising the steps of:

destaging the updated data from the second cache line to the source VLUN; and destaging the data from the first cache line to a target VLUN.

34. The method of claim 33, wherein the destaging of the updated data from the second cache line to the source VLUN precedes the destaging of the data from the first cache line to the target VLUN.

35. The method of claim 33, wherein the destaging of the data from the first cache line to the target VLUN precedes the destaging of the updated data from the second cache line to the source VLUN.

36. The method of claim 33, wherein the destaging of the updated data and the data from the cache memory to the source and target VLUNs is a background activity.

37. A method in a cache memory management system, comprising:
receiving a request for data from a first application;
determining the requested data is not in cache memory;
allocating a first search element and a first cache line descriptor that associate with a first cache line in cache memory;
staging the data from a source VLUN to the first cache line;
receiving another request for the data from a snapshot application; and
allocating a second search element, wherein the second search element and the
first cache line descriptor associate with the first cache line in cache memory.

38. The method of claim 37, further comprising the steps of:
receiving a request from the first application to store updated data;
allocating a third search element and a second cache line descriptor that associate with a second cache line for the updated data; and
writing the updated data into the second cache line.

39. The method of claim 38, further comprising writing the updated data from the second cache line and the data from the first cache line to one or more nonvolatile storage devices.

40. The method of claim 38, further comprising the steps of:
destaging the updated data from the second cache line to the source VLUN; and
destaging the data from the first cache line to a target VLUN.

41. The method of claim 40, wherein the destaging of the updated data from the second cache line to the source VLUN precedes the destaging of the data from the first cache line to the target VLUN.

42. The method of claim 40, wherein the destaging of the data from the first cache line to the target VLUN precedes the destaging of the updated data from the second cache line to the source VLUN.

43. The method of claim 40, wherein the destaging of the updated data and the data from the cache memory to the source and target VLUNs is a background activity.

44. The system of claim 1, wherein the cache manager receives a request to store updated data, wherein the cache manager converts the request to index to the second hash table pointer that points to the second hash table element that points to a second cache line descriptor associated with a second cache line for storing the updated data and writes the updated data to the second cache line.

45. The system of claim 44, wherein the data storage system writes the updated data from the second cache line and the data from the first cache line to one or more nonvolatile storage devices.

46. The system of claim 44, further comprising a source VLUN and a target VLUN, wherein the data storage system destages the updated data from the second cache line to the source VLUN and destages the data from the first cache line to the target VLUN.

47. The system of claim 46, wherein the data storage system destages the updated data from the second cache line to the source VLUN before the system destages the data from the first cache line to the target VLUN.

48. The system of claim 46, wherein the data storage system destages the updated data from the second cache line to the source VLUN after the system destages the data from the first cache line to the target VLUN.

49. The system of claim 46, wherein the data storage system destages the data and updated data from the first and second cache lines to the target and source VLUNs as a background activity.

50. The system of claim 44, 45, 46, 47, 48, or 49, wherein the first and second hash table elements each include a cache line descriptor pointer and a hash table element forward pointer, a hash table element backward pointer, a map list forward pointer, a map list backward pointer, a dirty list forward pointer, a dirty list backward pointer, a usage list forward pointer, a usage list backward pointer, a pinned list forward pointer, a pinned list backward pointer, a VLUN identifier, a logical block address, a use count, or a dirty bitmap.

51. The system of claim 44, 45, 46, 47, 48, or 49, wherein the first and second cache line descriptors each include a cache line pointer and a valid flag, a reader count, a writer count, a pending list, a valid bitmap, a modification in process bitmap, or a mirror pointer.

52. The system of claim 44, 45, 46, 47, 48, or 49, further comprising cache list functional pointers that point to the first hash table element, wherein the cache list functional pointers include a dirty list entry pointer, a least-recently-used pointer, a map list pointer, or a pinned list entry pointer.

53. The system of claim 16, wherein the cache manager receives a request to store updated data, wherein the cache manager converts the request to locate the second search element to point to a second cache line descriptor associated with a second cache line and writes the updated data to the second cache line.

54. The system of claim 53, wherein the data storage system writes the updated data from the second cache line and the data from the first cache line to one or more nonvolatile storage devices.

55. The system of claim 53, wherein the data storage system destages the updated data from the second cache line to the source VLUN and destages the data from the first cache line to the target VLUN.

56. The system of claim 55, wherein the data storage system destages the updated data from the second cache line to the source VLUN before the system destages the data from the first cache line to the target VLUN.

57. The system of claim 55, wherein the data storage system destages the updated data from the second cache line to the source VLUN after the system destages the data from the first cache line to the target VLUN.

58. The system of claim 55, wherein the data storage system destages the data and updated data from the first and second cache lines to the target and source VLUNs as a background activity.

59. The method of claim 30, further comprising the steps of:
requesting to store updated data;
converting the request into a second input to the hashing function;
outputting a second index to the hash table;
allocating a second hash table element CLD pointer and a second cache line descriptor to point to a second cache line for the updated data;
updating the data; and
writing the updated data into the second cache line.

60. The method of claim 59, further comprising writing the updated data from the second cache line and the data from the first cache line to one or more nonvolatile storage devices.

61. The method of claim 59, further comprising the steps of:
   destaging the updated data from the second cache line to the source VLUN; and
   destaging the data from the first cache line to a target VLUN.

62. The method of claim 61, wherein the destaging of the updated data from the second cache line to the source VLUN precedes the destaging of the data from the first cache line to the target VLUN.

63. The method of claim 61, wherein the destaging of the data from the first cache line to the target VLUN precedes the destaging of the updated data from the second cache line to the source VLUN.

64. The method of claim 61, wherein the destaging of the updated data and the data from the cache memory to the source and target VLUNs is a background activity.

65. The system of claim 4, 5, 6, 7, 8, or 9, wherein the second cache line descriptor includes a cache line pointer and a valid flag, a reader count, a writer count, a pending list, a valid bitmap, a modification in process bitmap, or a mirror pointer.

* * * * *